2,990,246
PREVENTION OF CAKING OF COMMON SALT
Thomas R. Scott, Northwich, Norman G. Bromby, Woodford, near Stockport, and Coningsby Allday, Sandiway, near Northwich, England, assignors to Imperial Chemical Industries Limited, London, England, a corporation of Great Britain
No Drawing. Filed Nov. 23, 1959, Ser. No. 854,584
Claims priority, application Great Britain Dec. 1, 1958
8 Claims. (Cl. 23—89)

The present invention relates to a process for treating common salt (sodium chloride) in order to reduce its tendency to cake and provides also an improved form of common salt having little or no caking tendencies.

It is well known that common salt tends to cake when it is stored, and this caking is frequently enhanced by the tendency for repeated crystallisation to occur if salt is exposed to alternating high and low atmospheric humidities.

A large number of processes have been proposed to counteract this caking tendency, and among the numerous materials used in these processes are water-absorbing compounds which are applied to or mixed with the salt granules or crystals. Such water-absorbing compounds may be soluble or insoluble. The water soluble materials such as calcium chloride tend to render the salt moist and sticky. The water insoluble compounds such as light basic magnesium carbonate give cloudy solutions when the salt is dissolved in water. Other processes aimed at producing an impervious film on the salt crystals, such as those involving the use of aluminium stearate and various oils, suffer from the drawback of imparting reduced rates of dissolution of the salt with consequent loss of saline taste of the crystals. Further, in all the processes using the materials referred to above, a comparatively large amount of the material is required in relation to the quantity of salt treated in order to counteract the caking tendency of the salt.

Use has also been made in the production of salt with reduced caking tendencies of compounds containing complex ions, for example potassium ferrocyanide. While such compounds can be effectively used at low concentrations, they can react under mildly acidic conditions with soluble iron salts to form highly coloured insoluble compounds, for example Prussian Blue. Even at the low concentrations employed this can result in a tinted salt which is undesirable for many purposes.

It has now been found that the caking tendency of sodium chloride can be considerably reduced by a process provided in accordance with the present invention and consisting of the addition to the solid salt of nitrilotriacetamide having the formula $N(CH_2CONH_2)_3$. The preferred amount of nitrilotriacetamide used is between .05% and .0001% by weight of the solid sodium chloride. Nitrilotriacetamide can also be used in conjunction with known anti-caking additives.

The present invention accordingly also provides an improved form of common salt which has little or no caking tendencies and which contains nitrilotriacetamide preferably well dispersed throughout the mass of salt crystals.

The nitrilotriacetamide may be added to the salt in any convenient way, though it is advantageous to ensure that its distribution throughout the salt is as uniform as possible. As the compound is readily soluble in water it may be sprayed in the form of a dilute solution onto dry solid salt. It may also be added to wet salt after separation from the mother liquor, or a solution of it may be mixed with the suspension of solid sodium chloride in its mother liquor during the salt manufacturing process.

The desirable proportion of the present additive to be used depends on the grain size and, therefore, surface area of the salt crystals to be treated. The preferred concentration for ordinary evaporated fine salt of particle size about 0.3 mm. is 0.001% by weight.

The present invention provides a product and a process for its production having the advantage that a durable counteracting of caking tendency is obtained with the use of a stable non-ionic compound in extremely low concentrations which does not produce colouration of the salt when exposed to certain conditions of storage frequently encountered. Further advantages are that the added compound is soluble, so that the treated salt gives a clear solution and the contamination of the salt is negligible since the amounts of additive used are very small.

Example I

Dry crushed rock salt of particle size about 2.5 mm. was sprayed with a dilute solution of nitrilotriacetamide in water to give material containing 1.5% moisture and 0.001% nitrilotriacetamide by weight on the salt. The salt was allowed to stand exposed to the air out of doors for a week, together with a sample treated with a similar amount of moisture but no nitrilotriacetamide. The treated salt did not cake, whereas the untreated salt caked hard.

Example II 50 tons of vacuum salt, after separation from its mother liquor on a filter, but still containing 4% brine, was sprayed with 1 lb. of nitrilotriacetamide dissolved in 100 lbs. of water and the salt then dried in a hot air drier. The salt resulting from this treatment did not cake when stored under various unfavourable atmospheric conditions. A similar batch of salt which was processed in the same way, but not treated with nitrilotriacetamide, gave salt which, when stored under the same conditions, was in the form of hard lumps.

What we claim is:
1. A process for reducing the tendency of common salt (sodium chloride) to cake characterised in that to the solid granular salt is added a small quantity of nitrilotriacetamide having the formula $N(CH_2CONH_2)_3$.
2. A process as claimed in claim 1 characterised in that the nitrilotriacetamide is added to the dry solid granular salt.
3. A process as claimed in claim 1, characterised in that the nitrilotriacetamide is added to the solid sodium chloride while the sodium chloride is suspended in mother liquor of sodium chloride during sodium chloride manufacturing process.
4. A process as claimed in claim 1 characterised in that the nitrilotriacetamide is added in aqueous solution.
5. A process as claimed in claim 4 characterised in that the nitrilotriacetamide solution is sprayed onto the solid salt.
6. A process as claimed in claim 1 wherein there is added to the solid granular salt from 0.05% to 0.0001% by weight of the nitrilotriacetamide.
7. A composition comprising a mixture of solid sodium chloride and nitrilotriacetamide.
8. Sodium chloride which contains nitrilotriacetamide in admixture with it and well dispersed throughout the mass of sodium chloride crystals in an amount of from 0.05% to 0.0001% by weight of the sodium chloride.

No references cited.